United States Patent [19]

Staar

[11] 4,010,917
[45] Mar. 8, 1977

[54] AUTOMATIC STOP DEVICE FOR A MAGNETIC TAPE RECORDING AND/OR PLAYBACK APPARATUS

[75] Inventor: Theophiel Clement Jozef Lodewijk Staar, Kraainem, Belgium

[73] Assignee: Staar, S.A., Brussels, Belgium

[22] Filed: July 29, 1975

[21] Appl. No.: 600,089

[30] Foreign Application Priority Data

July 30, 1974 France .............................. 74.26453

[52] U.S. Cl. ............................... 242/188; 242/191
[51] Int. Cl.² .................. G11B 15/06; G11B 15/54; B65H 25/32
[58] Field of Search .......... 242/191, 188, 190, 189, 242/201, 202, 186, 204, 210, 57; 250/561

[56] References Cited

UNITED STATES PATENTS

| 3,497,157 | 2/1970 | Hanes et al. ........................ 242/188 |
| 3,730,453 | 5/1973 | Hotchkiss et al. .................. 242/191 |
| 3,779,483 | 12/1973 | Inoue .................................. 242/191 |
| 3,913,519 | 10/1975 | Sugano .............................. 242/191 |

Primary Examiner—George F. Mautz
Attorney, Agent, or Firm—Leydig, Voit, Osann, Mayer & Holt, Ltd.

[57] ABSTRACT

A stop device for a magnetic tape recording and/or playback apparatus having an end of tape detector responsive to reference marks positioned near the ends of the magnetic tape and adapted to stop the tape drive in response to the detection of a mark. High tape speeds result in the reference mark being carried past the detector before the tape is completely stopped. To prevent retriggering of the automatic stop device such as when reversing the tape direction following an automatic stop, means are provided responsive to certain conditions within the tape drive for disabling the end of tape detector. More specifically, the speed of the take-up or supply reel is sensed to derive an indication of the amount of tape on such reel, that information being used to enable or disable the end of tape detector.

12 Claims, 31 Drawing Figures

AUTOMATIC STOP DEVICE FOR A MAGNETIC TAPE RECORDING AND/OR PLAYBACK APPARATUS

The present invention relates generally to automatic stop devices for magnetic tape recording and/or playback apparatus. More particularly the invention is described as embodied in a stop device for apparatus of the video type designed to accommodate magnetic tapes stored in self-contained cartridges comprising two reels which function as take-up reels and as supply reels in turn. These magnetic tapes are provided, near their two ends, with reference marks which interact with a detector of the recording and playback apparatus to cause the tape drive mechanism to stop automatically when the end of the tape is about to be reached. This automatic stop device is required in order to insure that the tape will not be damaged or torn off the reels to which it is attached; it is of great advantage in apparatus of the video type, because of the high tape speed, particularly during the winding or rewinding operation. Automatic stop devices of this type may utilize reference marks and detectors operating on optical, magnetic or conductive principles.

As the speed and inertia of the driving device increase, it becomes necessary to increase the spacing between the reference marks and the associated ends of the tape. In apparatus known heretofore, however, positioning of the reference marks at a distance from the respective ends of the tape involves a serious drawback. More specifically, when the magnetic tape is rapidly rewound, the reference marks are carried past the detectors before the tape is completely stopped. When the tape is then re-started in the opposite direction, the reference marks again pass the detector causing a further sudden undesired stop.

In order to remedy this drawback, the device described in the Belgian Pat. No. 769,192 in the name of applicant herein provides for a number of reference marks on the magnetic tape, distinguished:
- a. either by their position (e.g. on both sides of the longitudinal axis of the tape, on each side of the tape, etc.),
- b. by their nature (e.g. one magnetic and the other optical or conductive, etc.), predetermined maximum
- c. or by the respective characteristics of the reference marks of one and the same nature (frequency, shape, etc.).

One or the other of these differences between each type of reference mark serve to render one or other of the marks operative in order to cause the tape drive means to stop automatically, according to the direction in which the tape is moving when its end is reached. In the apparatus described in the aforementioned Belgian patent the automatic stop device comprises a first sensing element only responsive to the passage of a reference mark of a first type and a second sensing element only responsive to that of a reference mark of a second type. The automatic stop device is thus made dependent on the direction in which the tape is moving.

Although this solution meets the aforementioned requirements, it nevertheless suffers from the serious drawback that the automatic stop device is dependent on the type of reference marks used on the magnetic tape. In other words, the selective device sensitive to the direction of movement of the tape does not function if the tape is provided with a reference mark different from that for which the device has been designed. A further drawback resides in the fact that this solution calls for the presence of a number of different reference marks on the tape and for the presence of more than one detector in the apparatus.

An object of the present invention is to eliminate the aforementioned drawbacks and to provide a simple, efficient and economical stop control device capable of functioning with conventional types of reference marks.

In order to achieve these objects, the present invention provides an automatic stop device in a magnetic tape recording and/or playback apparatus having a drive mechanism for feeding magnetic tape between a supply reel to a take-up reel, and an end of tape detection device sensitive to reference marks situated near the extremities of the tape and adapted to stop the tape drive mechanism in response to the passage of said reference marks. Sensing means are provided responsive to the angular speed of one of the reels. Disabling means, responsive to the sensing means are adapted to disable the end of tape detector over a predetermined range of sensed speeds, the speed range being selected to prevent undesired operation of the end of tape detector such as on tape reversal following an automatic stop.

The invention will now be described in conjunction with certain illustrative embodiments, and with reference to the drawings, in which.

While the invention will be described in connection with certain preferred embodiments, it will be understood that there is no intent to limit it to those embodiments. On the contrary, the intent is to cover all alternatives, modifications and equivalents included within the spirit and scope of the invention as defined by the appended claims.

Figure 1:
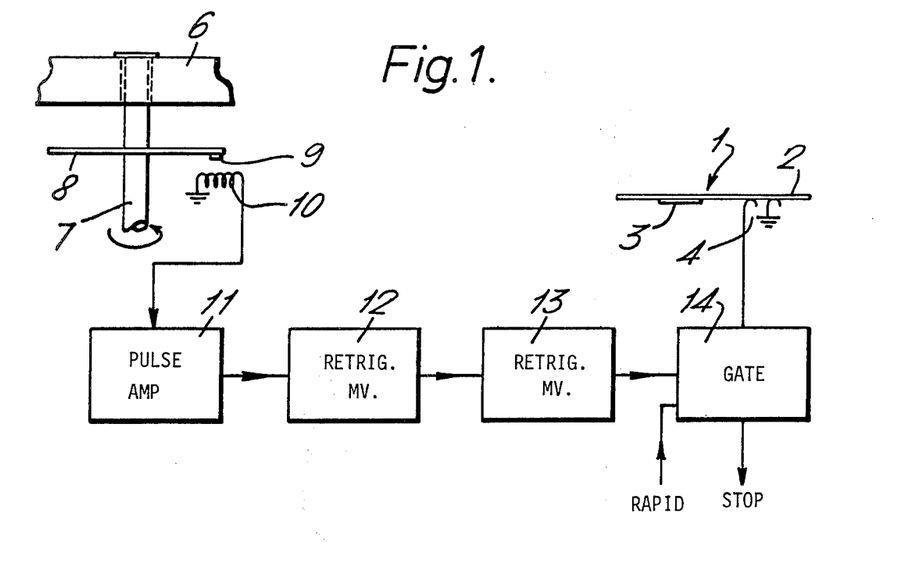
FIG. 1 is a block diagram illustrating an automatic stop device embodying the present invention.

Turning now to the drawings, FIG. 1 shows an automatic stop device for a magnetic playback and/or recording apparatus including a known type of end of tape detector adapted to stop the tape drive and/or to perform any equivalent or ancillary operation when a reference mark 3 on the tape passes in front of a sensor 4. In the example shown, the mark 3 is simply a conductive plate affixed to the magnetic tape 2, while the sensor 4 consists of two electrodes which are in contact with the tape, the distance between said electrodes being less than the length of the reference mark 3, so that the passage of the mark in front of the electrodes closes the electrical circuit of a device, not shown, which brings the drive of the magnetic tape 2 to a stop. This end of tape detection device 1, which forms no part of the present invention, may comprise other types of detectors, such as those functioning magnetically of photo-electrically.

In accordance with the present invention, means are provided including a monitoring circuit responsive to the rotational speed of the take-up reel or the supply reel of the recording and/or playback apparatus, such means being adapted to enable or disable the end of tape detector 1 in dependence upon the angular speed of one of the reels. The detector 1 is disabled over a predetermined rate of rotation of one or both of the reels, so as to prevent sudden undesired stops such as might otherwise occur, for example, at the start of the tape.

The invention makes use of the principle that the angular speed of the reels is a function of the amount of tape thereon. Since the magnetic tape in both recording and playback moves at a constant speed, it follows that the rotational speed of a given reel will decrease as it fills.

FIG. 1 shows reel 6 driven by a shaft 7; for purposes of the present description, the reel 6 may be considered a take-up reel. A disc 8 integral with the driving shaft 7 is provided on its periphery with a magnetic guide 9. Associated with the disc 8 is a magnetic pick-up 10, which responds to the passage of the guide 9 by producing an electrical pulse each time the magnetic guide passes the pick-up.

The assembly 8, 9 and 10, form a sensor responsive to the angular speed of the shaft 7. The particular form of sensor illustrated is one of several known types; alternative forms could easily be substituted such as those operating either by direct friction on the shaft 7 or via photo-sensitive or electric cells.

The pulses produced by the pick-up 10 are coupled to a pulse amplifier 11, the output of which is connected to a first retriggerable multivibrator 12 having a time constant $R_1C_1$. The selected time constant $R_1C_1$, which governs the duration of the triggered state of the multivibrator, is made greater than a minimum allowable period of the pulses from the pick-up 10. The output of the multivibrator 12 is connected to a second multivibrator 13, likewise retriggerable. The time constant $R_2C_2$ of the multivibrator 13 is greater than a maximum allowable period of the pulses from the pick-up 10. The output of the multivibrator 13 is connected to an electronic gate 14 situated in the circuit of the end of tape detector 1. According to the signal which it receives from the multivibrator 13, the gate 14 either enables or disables the end of tape detector by passing or blocking, respectively, the stop signal produced by the contacts 4 of the detector 1.

The gate 14 is preferably an electronic gate, but other elements performing the same function can obviously be employed, particularly switching elements, such as relays, photo-cells etc.

Figure 2A:
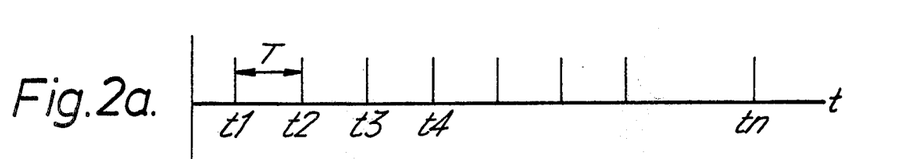
FIGS. 2a–2d and 3a–3d are diagrams illustrating waveforms within the circuit shown in FIG. 1.

The operation of the device shown in FIG. 1 may be explained with reference to FIGS. 2a–2d and 3a–3d. FIG. 2a shows the pulses $t_1 \ldots t_n$ produced by the pick-up 10 shaped by the amplifier 11 and coupled to the retriggerable multivibrator 12. As the frequency of these pulses is a function of the angular speed of the take-up reel 6, such frequency is at its maximum when the tape begins to be wound onto the reel 6. The time constant $R_1C_1$ of the multivibrator 12 is chosen so that it is longer than the period T of the pulses during this empty reel condition. The period T increases slightly with each rotation of the take-up reel. Since this increase in T, from each turn to the next, is rather slight, it is not taken into account in the diagrams. However it will be appreciated that the change in period T over the entire rotational operating speed range of the reel is quite significant.

Figure 2B:
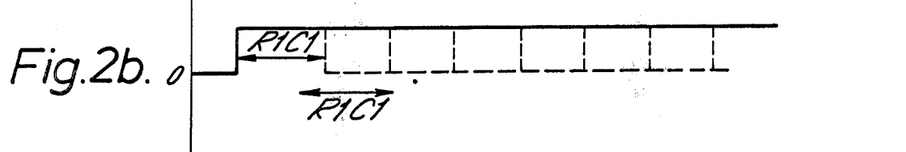
Figure 2C:
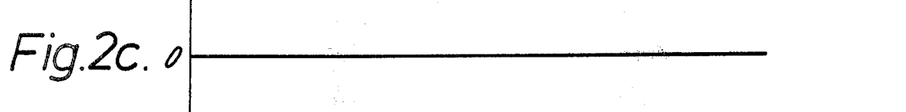
Figure 2D:
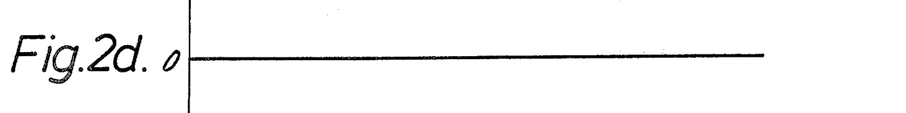

FIG. 2b shows the operation of the multivibrator 12 for a value of T less than $R_1C_1$. Then the first pulse $t_1$ occurs the multivibrator 12 is triggered from its stable state to a metastable state. It would normally resume its stable state following the expiration of the time constant $R_1C_1$, but as it is retriggerable and the second pulse $t_2$ occurs before the end of its time constant $R_1C_1$, it is retriggered for a time at least equal to $R_1C_1$, i.e. it remains in the triggered state as long as T remains below $R_1C_1$. During this time, because the output of multivibrator 12 remains high, no pulse is produced at the output (FIG. 2c) of the multivibrator 13. Accordingly, the gate 14, not receiving any signal from the multivibrator 13, remains in a blocking condition as shown in FIG. 2d, so that any pulse produced by the end of tape detector 1 in response to passage of the guide 3, has no effect on the automatic stop device. This is the case at the beginning of the tape when the take-up reel is empty.

As the take-up reel 6 fills, its angular speed decreases, causing the frequency of the pulses produced by the pick-up 10 to decrease correspondingly. At a certain rotational speed the period T of these pulses becomes greater than the constant $R_1C_1$ of the multivibrator 12. FIGS. 3a–3d illustrate the manner in which the apparatus responds when the period T is greater than the time constant $R_1C_1$.

Figure 3A:
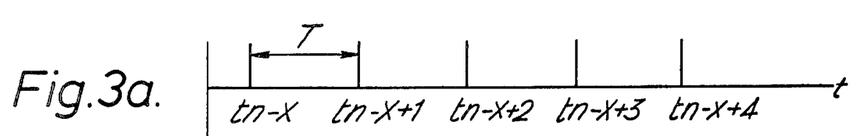
Figure 3B:
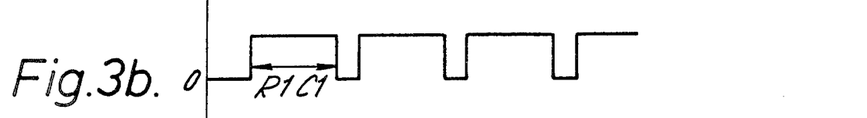

The first pulse $t_{n-x}$ of the series of pulses $t_{n-x}, t_{n-x+1} \ldots$ shown in FIG. 3a triggers the multivibrator 12 (FIG. 3b). As T is then greater than $R_1C_1$, the multivibrator is not retriggered, but is restored to its stable state after a period equal to $R_1C_1$. When the second pulse $t_{n-x+1}$ occurs, the flip-flop is once again triggered, so that its output forms a series of pulses of a period T as shown in FIG. 3b.

Figure 3C:
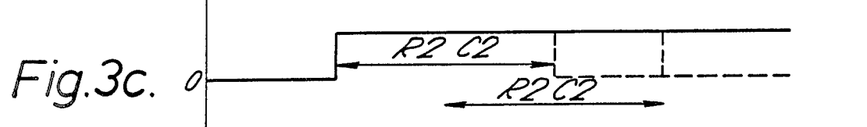
Figure 3D:
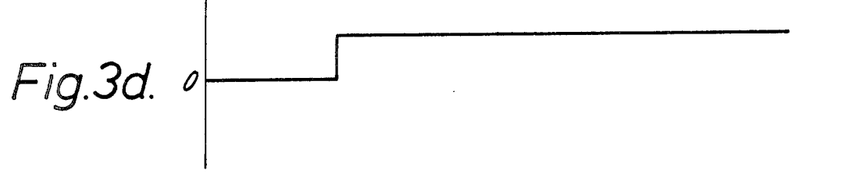

The multivibrator 13 is triggered by the first pulse produced by multivibrator 12, i.e. as soon as the period T of the pulses of the angular speed pick-up 10 of the take-up reel 6 exceeds the time constant $R_1C_1$ of the first multivibrator 12. Since the monostable multivibrator 13 is also retriggerable, and its time constant $R_2C_2$ is greater than the maximum period of the pulses $t_1 \ldots t_n$, it is retriggered for a period equal to its time constant $R_2C_2$ by each of the pulses produced by multivibrator 12. As a result, multivibrator 13 will remain triggered and its output will be high as shown in FIG. 3c. This high output enables the gate 14 (FIG. 3d), allowing such gate to pass any pulses or signals which might be produced by the end of tape detector 1. Accordingly, the end of tape detector is enabled to respond to the passage of a reference mark, to actuate the stop device and stop the tape drive.

The automatic stop device is thus made dependent on the angular speed of the take-up reel in the sense that it is rendered inoperative at the commencement of the tape and does not at that moment respond to the passage of the end of tape mark, thus preventing the sudden undesired stops mentioned above. Utilizing the teachings of the invention, it is also possible to cause the reel speed sensing device to respond to the angular speed of the supply reel. In this case the end of tape detector is disabled when the supply reel is rotating slowly, i.e. at the commencement of the tape, and is enabled as it empties, or during rapid winding or rewinding, in order to actuate the automatic stop device in response to the passage of a reference mark. This modification may be illustrated with reference to FIG. 1 if the reel 6 is considered to be the supply reel. The operation of the amplifier 11 and multivibrators 12 and 13 remains the same as described above. However the gate 14 is modified by inverting the logic described above so that it will block the passage of the pulses of the end of tape detector when the period T of the pulses produced by the speed pick-up associated with the supply reel is above $R_1C_1$ (FIGS. 3a–3d), and will allow the passage of the pulses of the detector when the period T falls below $R_1C_1$ (FIGS. 2a–2d). This last configuration possesses certain advantages over that described above in that the speed sensing device is effective to control the end of tape detector during all operating speeds of the tape drive including playing speed as well as rapid winding and re-winding. In the first embodiment wherein the speed sensor is responsive to the take-up reel, it may prove necessary in certain circumstances to override the speed sensor during rapid winding or re-winding to prevent the end of tape detector from being disabled during such conditions. This may be accomplished, for example, by an overriding input 15 of the gate 14, such input being activated during rapid tape movement to allow passage of any signals produced by the end of tape sensor to the automatic stop mechanism.

Figure 4:
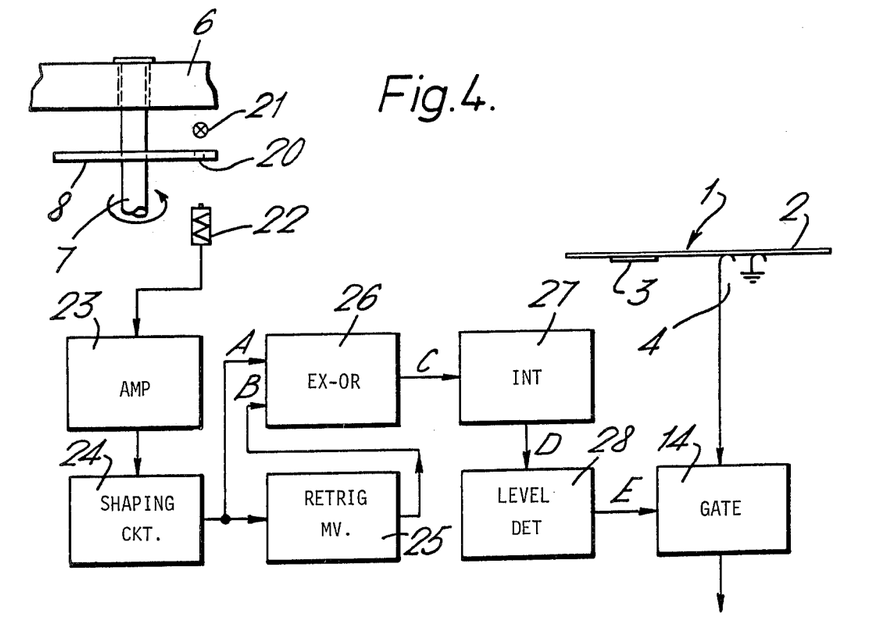
FIG. 4 is a block diagram of an automatic stop device illustrating a second embodiment of the invention.

FIG. 4 shows a second embodiment of the present invention. The elements have been given the same reference numerals as in FIG. 1 insofar as they have already appeared therein.

A disc 8 integral with the drive shaft 7 of the take-up reel 6 is provided with an aperture 20. A lamp 21 and a photocell 22 are positioned on opposite sides of the disc 8 in optical communication through the aperture 20. Each time the aperture 20 passes the light and photocell, the photocell produces a pulse having a width dependent upon the speed of rotation of the disc 8. These pulses are coupled via an amplifier 23 to a shaping circuit 24. The output of the shaping circuit 24 is coupled to a retriggerable multivibrator 25 having a time constant $T_M$. The pulses are also coupled to a first input of an Exclusive -OR gate 26. The output of the multivibrator 25 is connected to a second input B of the Exclusive-OR gate. Such gate produces an output pulse only when the signals occurring at its inputs A and B have opposite values.

The pulses produced by the Exclusive-OR gate 26 are integrated in an integrator 27 whose output is connected to a level-detector 28 which actuates the gate 14 coupled in the circuit of the end of tape detector 1.

The operation of the device will be explained with reference to FIGS. 5a–5e, 6a–6e, 7a–7e and 8a–8e, which show waveforms at various points in the circuit of FIG. 4 for different rotational speeds of the take-up reel 6.

The width of the pulses produced by the photo-electric cell is in inverse proportion to the angular speed of the take-up reel, i.e. the width T of the pulses increases as the reel 6 if filled. The time constant $T_M$ of the multivibrator 25 is adjustable by its RC value. The selected RC value is made equal to the width T of the pulses produced by the cell 22 under the conditiion when the automatic stop device is required to be disabled. This is the case, for example, at the commencement of the tape, when T is at its minimum. The multivibrator 25 can thus be adjusted so that its time constant $T_M$ will be equal to the width T of the pulse produced during the first revolution of the shaft 7 of the take-up reel 6.

Figure 5A:
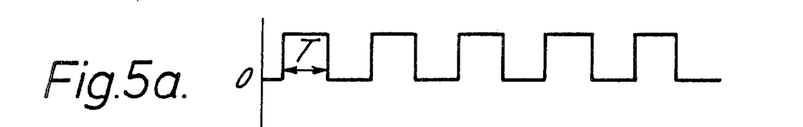
FIGS. 5a–5e, 6a–6e, 7a–7e and 8a–8e are diagrams illustrating waveforms within the circuit shown in FIG. 4.
Figure 5B:
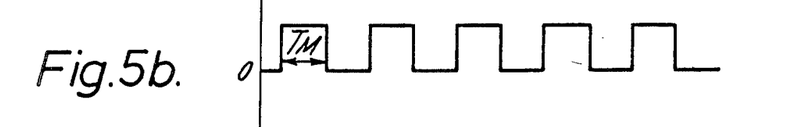
Figure 5C:
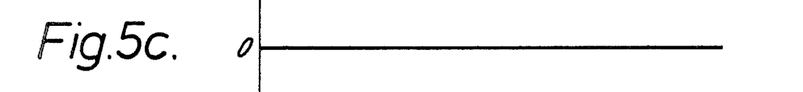
Figure 5D:
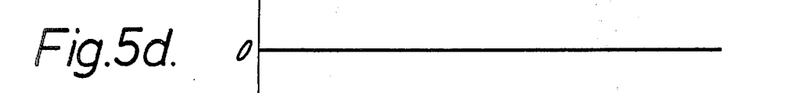
Figure 5E:
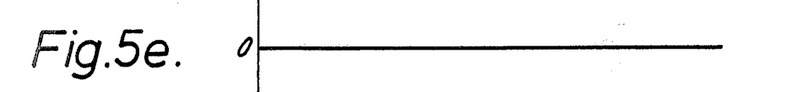

FIG. 5a shows the shaped pulses at the input A of the Exclusive-OR gate 26 when T is at its minimum. The multivibrator 25 being triggered by these pulses and being set to a time constant $T_M$ which at that moment will be equal to T, couples a signal (FIG. 5b) to the B input of the Exclusive-OR gate which is identical to that at the A input thereof. Because the Exclusive-OR gate 26 only produces an output pulse when the signals at its inputs A and B are opposite, the voltage remains zero at points C, D and E, as shown in FIGS. 5c, 5d and 5e respectively. The gate 14, remaining in its blocking state, preventing the passage of any signal produced by the detector 1, thus enabling the reference mark 3 to pass in front of the detector without bringing the apparatus to a stop.

If the setting of the multivibrator 25 is based on the first revolution of the shaft of the take-up reel 6, the width of the pulse produced during the second revolution is already greater than $T_M$. This increase, however, is so small that it has not been taken into account in the drawings. It may nevertheless be sufficient to generate a pulse at the output of the Exclusive-OR gate 26, but the width of this pulse is not yet sufficient to reach the threshold of the level-detector 28 after integration.

Figure 6A:
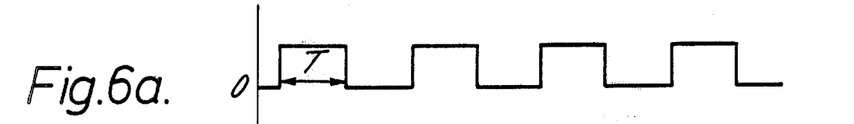
Figure 6B:
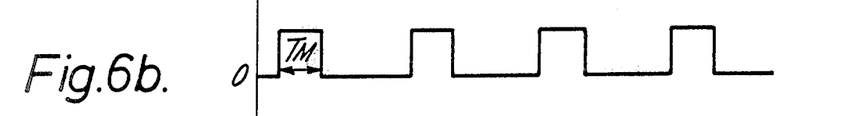
Figure 6C:
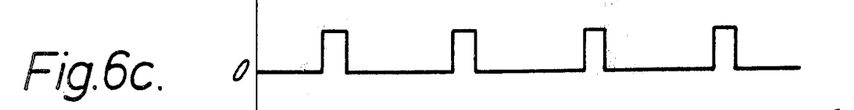
Figure 6D:
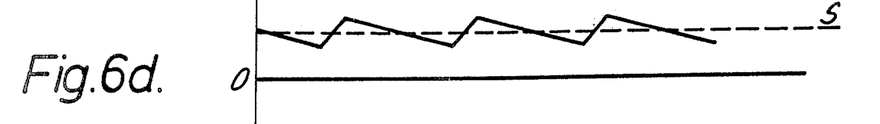
Figure 6E:
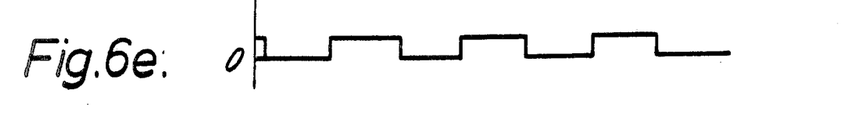

As the take-up reel 6 fills, its angular speed decreases and the length T of the pulses increases. In FIGS. 6a and 6b, showing the waveforms at the inputs A and B respectively of the Exclusive-OR gate after a certain number of revolutions of the take-up reel, it may be seen that T is slightly above the constant $T_M$ of the multivibrator 25. FIG. 6c shows that the pulses produced by the Exclusive-OR gate 26 are of a width equal to the difference between T and $T_M$. The width of the pulses at C in FIG. 4 therefore increases as the reel 6 fills. The voltage level at the output D of the integrator 27 is shown in FIG. 6d. This sawtooth voltage may exceed and also fall below the threshold S of the level-detector 28. Whenever the voltage rises above the threshold S a signal (FIG. 6e) initiating the opening of the gate 14 will occur at E in FIG. 4.

Figure 7A:
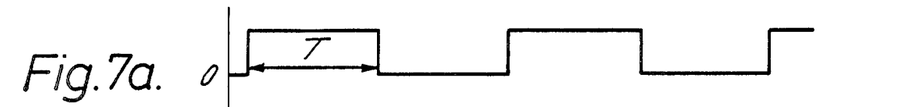
Figure 7B:
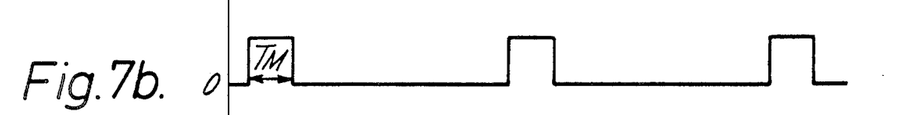
Figure 7C:
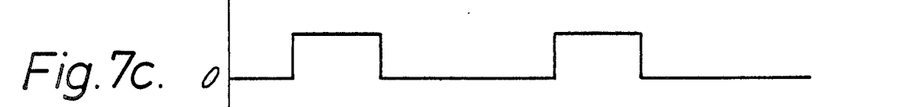
Figure 7D:
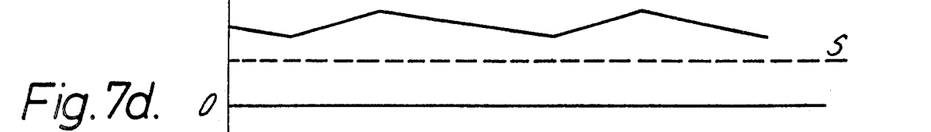
Figure 7E:
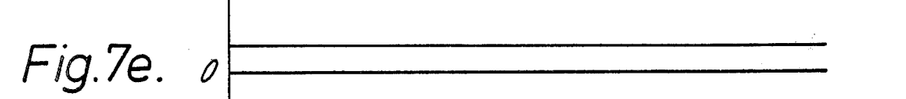

When the reel 6 is nearly full and its angular speed reaches its minimum, the difference between T and $T_M$ increases still further (FIGS. 7a and 7b). The width of the pulses produced by the Exclusive-OR gate 26 increases (FIG. 7c), so that the voltage at D no longer falls below the threshold S (FIG. 7d). The level-detector thus now supplies a constant voltage (FIG. 7e) which keeps the gate 14 open, allowing the passage of any signals produced by the end of tape detector 1, to stop the apparatus automatically on the passage of the reference mark 3.

Figure 8A:
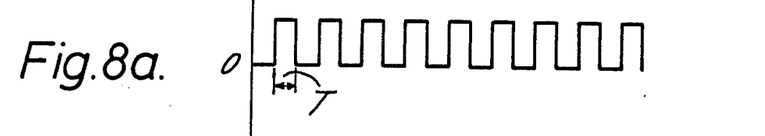
Figure 8B:
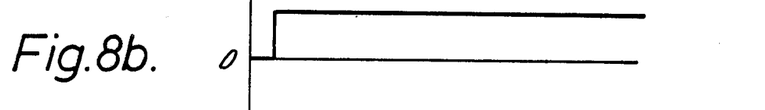
Figure 8C:
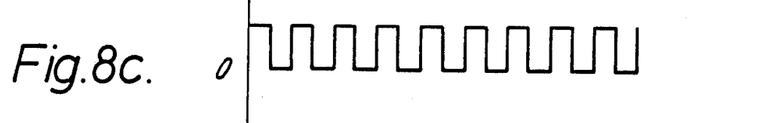
Figure 8D:
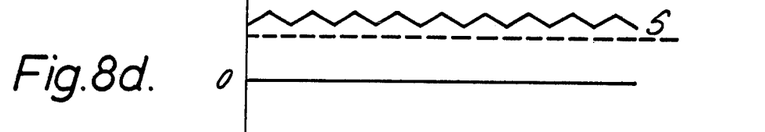
Figure 8E:
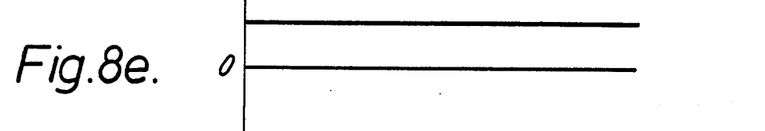

FIGS. 8a–8e illustrate the operation of the device in the case of rapid movement of the magnetic tape, as when the latter is being rapidly wound or re-wound. The width T of the pulses (FIG. 8a) of the photoelectric cell 22 is then less than the time constant $T_M$ of the monostable multivibrator 25. Since this multivibrator is retriggerable, it will remain in the triggered state once it has been triggered by the first pulse, being retriggered by each of the subsequent pulses. FIGS. 8a and 8b show the voltages at the inputs A and B of the Exclusive-OR gate 26, which responds by causing its output to produce a series of pulses having the same width and frequency (FIG. 8c) as those supplied at its input A. In view of the high frequency of these pulses, the voltage at the output D of the integrator 27 will remain well above the level of the threshold S of the level-detector 28 (FIG. 8d). The gate 14 will thus remain open, since the voltage at E is constant (FIG. 8e). This once again insures that the apparatus will be shut off automatically when the end of the tape is reached.

Figure 9:
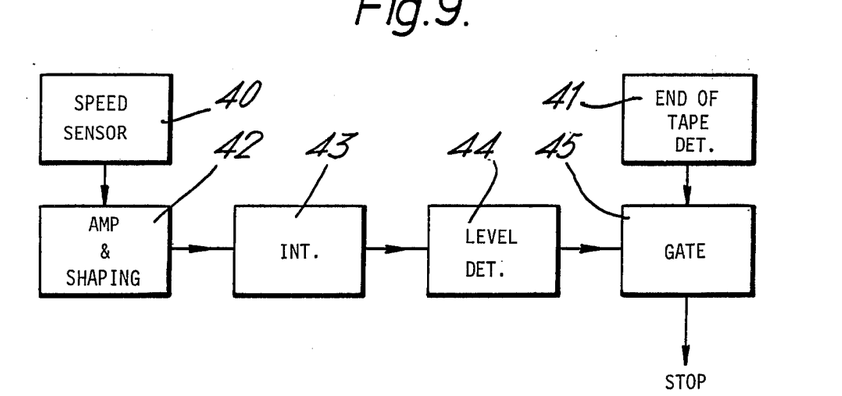
FIG. 9 is a block diagram of an automatic stop device illustrating a third embodiment of the invention.

FIG. 9 shows a third embodiment in which the pulses produced by an angular speed detector of the take-up reel are integrated and passed to a level-detector. The numerals 40 and 41 designate an angular speed detector of the take-up reel and an end of tape detector respectively, and these can be designed on the same principle as those described for the embodiments illustrated in FIGS. 1 and 4. The circuit according to the embodiment shown in FIG. 9 also comprises an amplification and shaping circuit 42, an integrator 43, a level-detector 44 and a gate 45. The pulses produced by the speed sensor 40, having a frequency which decreases as the take-up reel fills, are integrated by the integrator 43. When the voltage at the output of the latter falls below a certain predetermined threshold the level-detector causes the gate 45 to open, thus enabling the apparatus to be automatically brought to a stop in response to the detection of the end of tape mark.

The embodiment shown in FIG. 9 may also be arranged in such a manner that the operation of the gate 45 controlling the end of tape detector is dependent on the angular speed of the supply reel. For this purpose, the level detector 44 must be configured so as to cause the gate 45 to open when the voltage at the output of the integrator exceeds a certain predetermined threshold.

In a fourth embodiment operating in accordance with the same general principles described above, but not shown in the drawing, the angular speeds of the take-up reel and supply reel are compared and a gate is caused to open to pass the signal produced by the end of ape detector from the moment when the difference between these speeds rises above a certain preset value, particularly towards the middle of the tape.

This embodiment, however, obviously calls for the presence of two speed detectors. The operation of comparing the speeds may be performed using a pulse counter clocked by the angular speed detector of the take-up reel and reset to zero by each of the pulses produced by the speed detector of the supply reel. When the angular speed of the take-up reel falls below that of the supply reel the reading of the counter no longer exceeds zero, and from this moment onwards an "opening signal" is supplied to a gate in order to allow passage of the signal produced by the end of tape detector.

The speeds can also be compared by the transformation of the signals of each speed detector into a voltage having an amplitude which is a function of frequency, and by the opening of a gate from the moment when the two voltages are equal. Alternatively, the gate may be opened from the moment when the difference between the voltages falls below a certain predetermined value.

I claim as my invention:

1. In an automatic stop device for a magnetic tape recording and/or playback apparatus, said apparatus including a drive mechanism for transferring magnetic tape between a supply reel and a take up reel, and an end of tape detector sensitive to reference marks positioned on the magnetic tape near the ends thereof and adapted to stop the tape drive mechanism in response to the passage of said reference marks, the improvement comprising, means for sensing the rotational speed of one of said reels, means for establishing a threshhold speed, and means responsive to the relationship between said sensed speed and said threshhold speed for diasbling said end of tape detector at the start of the tape when said take up reel is empty, thereby to prevent premature operation of said stop device.

2. The improvement as set forth in claim 1 wherein said sensing device is coupled to said take up reel, said disabling means being responsive to sensed speeds above a predetermined maximum threshhold and operative to disable said end of tape detector at sensed speeds above said threshhold speed to prevent operation of the stop device.

3. The improvement as set forth in claim 2 wherein the disabling means includes gate means coupled to said end of tape detector for disabling said detector above said threshhold speed.

4. The improvement as set fourth in claim 1 wherein said sensing means is responsive to said supply reel, said disabling means being responsive to speeds below a predetermined minimum threshhold and operative to disable said end of tape detector at sensed speeds below said threshhold speed.

5. The improvement as set forth in claim 4 wherein the disabling means includes gate means coupled to the end of tape detector for disabling said detector below said threshhold speed.

6. The improvement as set forth in claim 1 wherein the sensing means comprises a speed detector for producing pulses having a period related to the angular speed of one of said reels, said threshhold establishing means including a first retriggerable multivibrator having a time constant greater than a predetermined minimum period, means coupling said speed detector to the input of said first retriggerable multivibrator, a second retriggerable multivibrator having a time constant greater than a predetermined maxiumum period and having its input coupled to the output of said first retriggerable multivibrator, and gate means within said disabling means responsive to said second retriggerable multivibrator for enabling and disabling said end of tape detector in dependence upon the sensed speed.

7. The improvement as set forth in claim 6 wherein said speed detector is coupled to said take up reel, said gate means being adapted to disable said end of tape detector when the sensed speed is above said threshhold speed.

8. The improvement as set forth in claim 6 wherein the speed detector is coupled to said supply reel, said gate means being adapted to disable said end of tape detector when the sensed speed is below said threshhold speed.

9. The improvement as set forth in claim 1 wherein the sensing device includes photo-electric means adapted to produce pulses having a width which is a function of the angular speed of one of said reels, said threshhold establishing means including an Exclusive-OR gate having a first input driven by said pulses, a retriggerable multivibrator having an input driven by said pulses, the output of said retriggerable multivibrator being coupled to a second input of said Exclusive-OR gate, an integrator coupled to the output of said Exclusive-OR gate, a level detector driven by said integrator, and gate means within said disabling means responsive to the level detector for enabling the disabling means responsive to the level detector for enabling the disabling said end of tape detector in dependence upon said sensed speed.

10. The improvement as set forth in claim 9 wherein the time constant of the retriggerable multivibrator is equal to the width of the pulses produced by the photo-electric means at the angular speed at which the end of tape detector is to be disabled.

11. The improvement as set forth in claim 10 wherein the Exclusive-OR gate is adapted to produce output pulses having a width equal to the difference between the time constant of the multivibrator and the width of the pulses produced by the photo-electric means, said integrator being adapted to integrate the pulses produced by said Exclusive-OR gate, said level detector being operative to enable said gate means when said integrated pulses exceed the level of said level detector.

12. The improvement as set forth in claim 1 wherein the sensing means includes means for producing pulses having a width which is a function of the angular speed of one of said reels, said threshhold establishing means including means for integrating said pulses to produce a voltage level, and level detector means for establishing a threshhold voltage level and responsive to said integrating means for producing an output signal when said voltage level passes said threshhold level, and gate means within said disabling means responsive to said level detector for enabling and disabling said end of tape detector in dependence on the sensed speed.

* * * * *